Feb. 5, 1952  B. C. ANDERSON  2,584,530
FISH NET
Filed Feb. 24, 1950
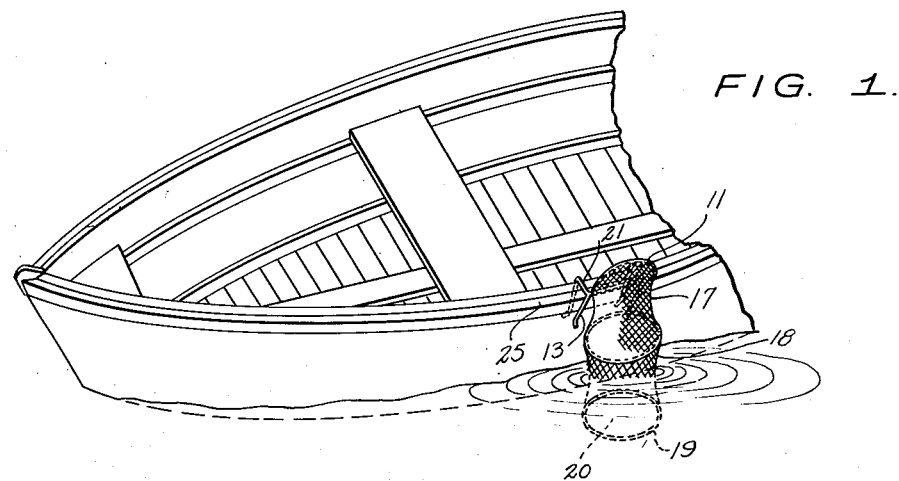
FIG. 1.
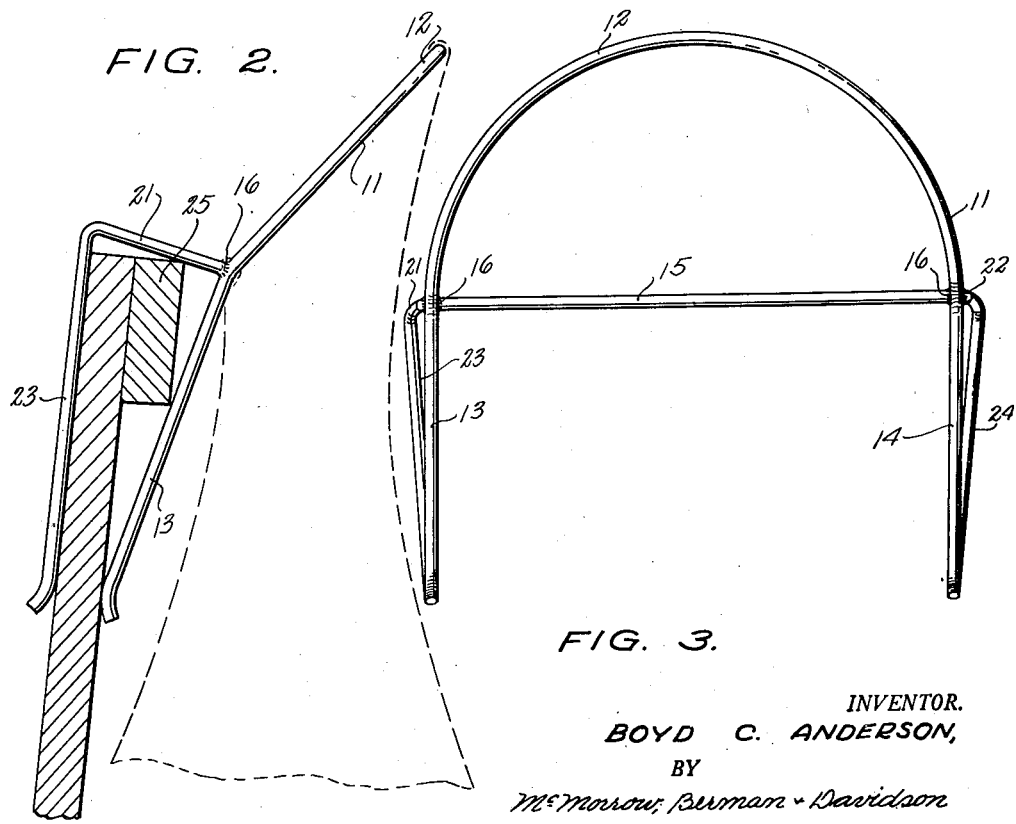
FIG. 2.
FIG. 3.
INVENTOR.
BOYD C. ANDERSON,
BY
McMorrow, Berman & Davidson
ATTORNEYS.

Patented Feb. 5, 1952

2,584,530

UNITED STATES PATENT OFFICE 2,584,530

FISH NET

Boyd C. Anderson, St. Marys, Ohio

Application February 24, 1950, Serial No. 146,057

1 Claim. (Cl. 43—55)

This invention relates to fishing, and more particularly to means for receiving and holding the fish after they have been caught to retain them in a fresh and live condition.

An object of the invention is to provide a fish net for receiving the fish after they have been caught with novel means for suspending the fish net from the side of a boat so that the fish net will be firmly held against loss.

Another object of the invention is to provide a fish net having a supporting ring formed with means for engaging the gunwale of a boat so that the lower portion of the fish net will be positioned in the water for the purpose of keeping the fish alive.

A further object of the invention is to provide a fish net having a net supporting ring formed with depending arms arranged to engage the gunwale of a boat so that the net supporting ring will be supported at an angle from the top edge of the boat and be disposed on the outside thereof.

With these and other objects in view the invention consists of the construction, arrangement and combination of parts of which it is composed, to be hereinafter more fully described and claimed.

In the accompanying drawing:

Figure 1 is a perspective view of a portion of a fisherman's boat, showing a fish net embodying the present invention mounted thereon;

Figure 2 is a vertical transverse section of the gunwale portion of the boat shown in Figure 1, showing the upper portion of the fish net in side elevation, the net being indicated by broken lines; and, Figure 3 is a front elevation of the upper portion of the fish net shown in Figure 2 detached from the boat, the net being removed therefrom for clearness of illustration.

Referring to the drawing, the invention comprises a D ring 11 having an arcuate mid-section 12 and legs 13 and 14 depending therefrom and arranged at an angle with respect thereto as shown in Figure 2.

Bridging the space between the D ring and disposed substantially at the junction of the legs 13 and 14 with the mid-section 12, is a bar 15. The bar 15 may be connected to the D ring by any suitable means. In the present instance the D ring and the bar are shown as being formed of suitable round rods, with the bar 15 connected to the D ring by welding 16. The construction is such that the D ring is closed by the bar 15 at a point remote from the extremities of the legs 13 and 14. The D-shaped ring thus formed provides a hoop to which is adapted to be secured the open upper end portion or mouth of a fish net 17. The fish net 17 may be of any desired construction, preferably of tubular open mesh fabric, carrying an intermediate hoop or ring 18 and a lower hoop or ring 19 arranged at the bottom 20. It will be understood that the hoops 18 and 19 are arranged to maintain the open mesh fabric of the fish net 17 in proper tubular position so that a receptacle is provided for the fish, as shown in Figure 1.

Extending outwardly from the ends of the bar 15 in a direction away from the D ring, are arms 21 and 22. The arms 21 and 22 project downwardly from the upper ends of legs 13 and 14, respectively, at an angle less than 90 degrees with respect to the longitudinal axis of each of the said respective legs. Depending from arm 21 and associated with the leg 13 is a leg 23, and depending from arm 22 and associated with the leg 14 is a leg 24. The legs 13 and 23 and 14 and 24 provide pairs of grip members at each side of the D ring, the legs of each pair being arranged at an angle with respect to each other with the lower extremities of each pair of said legs closer together than their upper portions, as shown in Figure 2. The lower portions of the legs are spreadable apart to increase the normal disposition thereof to removably receive a support member of a boat, such as the gunwale 25, Figure 2. The construction and arrangement of the several legs of the device is such that the D ring will be frictionally held in position on its support 25. It will also be noted that when the device is mounted on a boat, the D ring will be disposed at an angle on the outside of the boat. In this way the mouth of the fish net 17 will be conveniently disposed so as to receive fish, while the main body of the net will be so disposed alongside of the boat so as to provide a suitable receptacle having sufficient room for the fish to move freely therein so that they will not die.

When through fishing the device can be readily detached from the boat by using the mid-section 12 of the D ring as a bail or handle to pull the device upwardly an amount sufficient to disengage the legs from the gunwale of the boat. The fish net, with the fish therein, can also be readily carried from the boat, by using the D ring as a handle. It will also be noted that the fish net is very practical and convenient to fishermen, since it is always open at the top and in position to receive fish when mounted on a boat in the above described manner. In addition to being readily attached to a boat the fish net can also be used on land by inserting the legs of the D ring into the ground of the bank of a stream or waterway.

What I claim is:

A fish holder adapted for attachment to the gunwale of a boat comprising a first pair of spaced legs having adjoining upper and lower ends, a fish net, the upper end of each leg having a laterally extending arm attached thereto, said arms being coplanar and projecting downwardly from the respective upper ends of said legs at an angle less than 90 degrees with respect to the longitudinal axis of each respective leg, a second pair of legs, each leg of said second pair of legs having upper and lower ends, the upper ends of said second pair of legs being connected to and extending from the other ends of said arms and the lower ends of said second pair of legs being disposed adjacent to and in confronting relation with the lower ends of said first pair of legs, said second pair of legs extending at a different angle from the arms than the angle at which the first pair of legs extends from said arms, a bar connecting the upper ends of the second pair of legs, and an arcuate member attached to and extending at an angle from the upper ends of the second pair of legs, said fish net having its upper end secured to said arcuate member.

BOYD C. ANDERSON.

REFERENCES CITED

The following references are of record in the file of this patent:

UNITED STATES PATENTS

| Number | Name | Date |
|---|---|---|
| 179,712 | Marsh | July 11, 1876 |
| 313,515 | Parker | Mar. 10, 1885 |
| 380,543 | Allen | Apr. 3, 1888 |
| 796,294 | Clark | Aug. 1, 1905 |
| 886,337 | Balken | May 5, 1908 |
| 1,086,218 | Reed | Feb. 3, 1914 |
| 1,284,579 | Brown | Nov. 12, 1918 |
| 1,863,988 | Kupfer | June 21, 1932 |
| 1,996,303 | McConnell | Apr. 2, 1935 |
| 2,055,218 | Itczak | Sept. 22, 1936 |